(12) United States Patent
Parry

(10) Patent No.: US 7,176,811 B1
(45) Date of Patent: Feb. 13, 2007

(54) PRESSURE ALTIMETER ELECTRICAL TESTING

(75) Inventor: D. Mark Parry, Layton, UT (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 148 days.

(21) Appl. No.: 11/073,136

(22) Filed: Mar. 7, 2005

(51) Int. Cl.
*G08B 21/00* (2006.01)

(52) U.S. Cl. ............ 340/945; 73/384; 73/170.02; 73/717

(58) Field of Classification Search ........ 340/945, 340/970, 977; 73/178 R, 179, 182, 170.02, 73/170.14, 384, 717, 1.57; 342/173; 701/4
See application file for complete search history.

(56) References Cited

U.S. PATENT DOCUMENTS

| | | | |
|---|---|---|---|
| 2,638,788 A | 5/1953 | Larkin | |
| 3,263,482 A | 8/1966 | Shank | |
| 3,276,255 A | 10/1966 | Hattendorf | |
| 3,548,632 A | 12/1970 | Damrel, Jr. et al. | |
| 3,677,062 A | 7/1972 | King et al. | |
| 3,713,340 A * | 1/1973 | Springer | 73/384 |
| 4,253,335 A * | 3/1981 | Shimomura | 73/384 |
| 4,531,127 A * | 7/1985 | Springer | 342/165 |
| 4,658,829 A | 4/1987 | Wallace | |
| 5,260,874 A * | 11/1993 | Berner et al. | 701/33 |
| 5,272,906 A | 12/1993 | Bowers, Jr. | |
| 6,326,748 B1 | 12/2001 | Springer | |
| 6,626,024 B1 * | 9/2003 | Hedrick | 73/1.78 |
| 2004/0178949 A1 * | 9/2004 | Brettner et al. | 342/173 |
| 2004/0186635 A1 * | 9/2004 | Manfred | 701/4 |

* cited by examiner

*Primary Examiner*—Brent A. Swarthout
(74) *Attorney, Agent, or Firm*—Gerald B. Hollins; AFMCLO/JAZ

(57) ABSTRACT

A test apparatus and method of electrical testing especially useful for verifying normal performance of essential functions in an aircraft atmospheric pressure responsive auxiliary altimeter under either of flight line or maintenance shop conditions. The tester provides electrical power and control signals needed to energize each of three functions in the considered altimeter instrument including instrument face illumination, altimeter stiction-limiting mechanical vibration generation, aircraft output signal generating potentiometer function and enables electrical current and voltage monitoring relating to the instrument functions being tested. Replacement of individual test instruments and other informal test apparatus with a convenient and probably more electrical accident-free integrated tester is contemplated.

20 Claims, 3 Drawing Sheets

PRESSURE ALTIMETER ELECTRICAL TESTING

RIGHTS OF THE GOVERNMENT

The invention described herein may be manufactured and used by or for the Government of the United States for all governmental purposes without the payment of any royalty.

BACKGROUND OF THE INVENTION

Accurate knowledge of operating altitude is so critical to aircraft use and safety that it is common practice in many aircraft of either the military or the civilian types to include more than a single altitude indicating instrument in the airframe. Moreover, in an extension of this redundancy philosophy, it is often deemed wise to have these parallel instruments be of differing operating principle in order that a failure event or an accuracy jeopardizing event in one instrument can be recognized and tolerated with minimum impact on flight operation.

Thoughts of this type have resulted in the inclusion of an atmospheric pressure responsive standby auxiliary altimeter instrument in presently used military aircraft including the F-15E aircraft. This instrument is usually mounted in the instrument panel of the aircraft where it provides a visually discernable indication of altitude to the aircraft pilot or crewmembers and also can also provide an electrical signal representative of measured altitude to an automatic pilot or a computer or similar apparatus. Altimeters of this type, although simple and reliable in their atmospheric pressure responsive operating principle, are found to need periodic testing, calibration, maintenance and overhaul in order to function with needed accuracy and dependability. Work of this type may be accomplished with aid of the present invention while the altimeter is yet within the instrument panel of the aircraft or may be accomplished while the instrument is removed from the aircraft and undergoing bench examination or repair.

Heretofore it has been common practice to employ a collection of equipment in order to verify the satisfactory function of the atmospheric pressure responsive standby auxiliary altimeter instrument. In addition to a source of controllable pressure for changing the altitude indicated by the instrument under test, it is, for example, common to use three power supplies, two digital multimeters and a group of fourteen individual test leads in order to access the three active functions included in such altimeters. In the instance of the standby pressure altimeter instrument, for example, these functions include an electrical potentiometer controlled as to wiper arm position by the pressure responsive element of the altimeter, a mechanical vibration generating element used for reducing the effects of mechanical "stiction" in the linkage of the instrument and an assembly of electric lamps used for lighting the instrument face. In the F-15E standby pressure altimeter instrument, each of these functions happens to require a different operating voltage in order to function properly.

SUMMARY OF THE INVENTION

The present invention provides a testing apparatus and a testing method for verifying the performance of plural functions in an aircraft altimeter.

It is therefore an object of the present invention to provide a convenient integrated tester for a standby pressure operated aircraft altimeter.

It is another object of the invention to provide a tester for the instrument lighting, the stiction reducing vibration and the electrical output potentiometer functions of a pressure operated aircraft altimeter.

It is another object of the invention to reduce the clutter and confusion associated with the use of fundamental equipment in performing an aircraft altimeter test.

It is another object of the invention to provide a portable aircraft altimeter testing apparatus that may be used in either aircraft flight line or aircraft maintenance settings.

It is another object of the invention to provide an aircraft altimeter test apparatus in which an operator may select a desired altimeter test from a plurality of available tests.

It is another object of the invention to provide an aircraft altimeter test set in which the environmental conditions encountered by an altimeter in aircraft use may be conveniently duplicated.

These and other objects of the invention will become apparent as the description of the representative embodiments proceeds.

These and other objects of the invention are achieved by the method of testing illumination operation, mechanical stiction-reducing vibration generation and electrical output signal communication functions in an atmospheric pressure responsive aircraft standby auxiliary altimeter instrument, said method comprising the steps of:

collecting an assembly of electrical, electronic and electromechanical components enabling of said testing into a portable enclosure having a plurality of test controls, audible and visual operator communicating transducers and electrical measurement connections received on an external portion thereof;

connecting said assembly of electrical, electronic and electromechanical components with a source of aircraft compatible direct current electrical energy and with an aircraft standby auxiliary altimeter instrument under test by way of tethering electrical conductors;

configuring said portable enclosure assembly of electrical, electronic and electromechanical components into a circuit network suited to energizing a selected first one of said illumination operation, mechanical stiction reducing vibration generation and electrical output signal communication functions in said aircraft standby auxiliary altimeter instrument; using selected of said plurality of test controls;

heeding a plurality of indications, warnings and suggestions communicated by said audible and visual operator communicating transducers during said configuring step;

holding said selected first one of said illumination operation, mechanical stiction reducing vibration generation and electrical output signal communication functions of said altimeter instrument in a standby state of non-energization until completion of said configuring and heeding steps;

verifying normal operation of said selected illumination operation, mechanical stiction-reducing vibration generation and electrical output signal communication functions in said aircraft altimeter instrument in response to a manually initiated termination of said holding step;

repeating said configuring, observing, holding and verifying steps for a second selected one of said illumination operation, mechanical stiction reducing vibration generation and electrical output signal communication functions in said pressure responsive altimeter instrument;

re-accomplishing said configuring, observing, holding and verifying steps for a remaining third selected one of said illumination operation, mechanical stiction reducing vibration generation and electrical output signal communication functions in said pressure responsive altimeter instrument.

BRIEF DESCRIPTION OF THE DRAWINGS

The accompanying drawings incorporated in and forming a part of the specification, illustrate several aspects of the present invention and together with the description serve to explain the principles of the invention.

DETAILED DESCRIPTION

Figure 1:
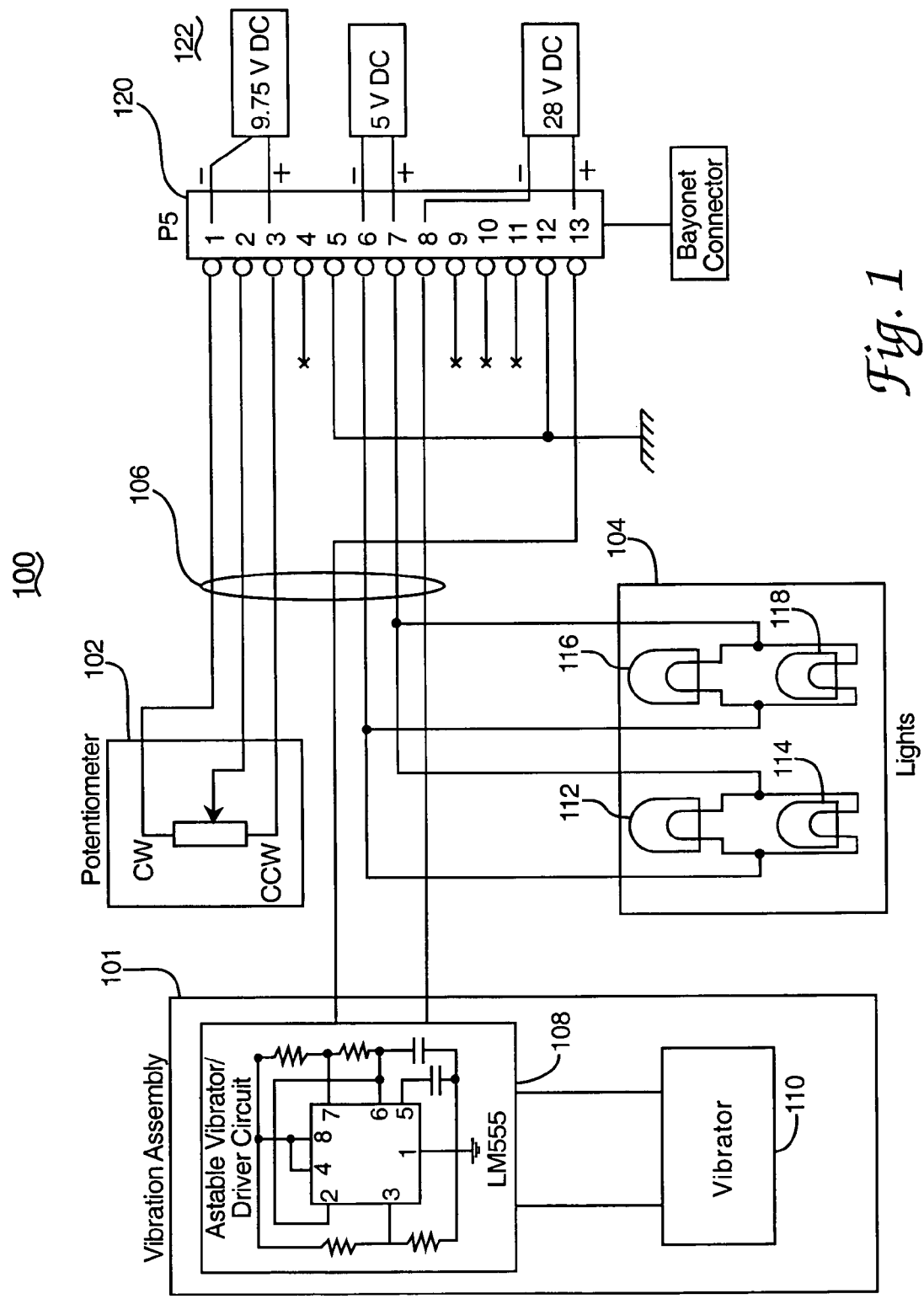
FIG. 1 shows an electrical schematic diagram of components in an atmospheric pressure responsive standby auxiliary altimeter instrument subject to analysis with use of the present invention.

FIG. 1 in the drawings shows an electrical schematic diagram of essential components in an aircraft atmospheric pressure responsive or barometric standby auxiliary altimeter instrument 100 subject to analysis with use of the present invention. Generally the FIG. 1 altimeter components include a mechanical vibration generating apparatus 101, an electrical potentiometer 102 mechanically connected with the atmospheric pressure responsive element of the altimeter, an array of altimeter instrument face-illuminating lamps 104, a plurality of electrical conductor leads 106 and an electrical connector 120. These components are also referred to herein as altimeter function components. FIG. 1 also shows at 122 a representation of the three voltage source power supplies needed to operate the altimeter 100.

In the FIG. 1 drawing it may be observed that the altimeter vibration source 101 includes a vibrator component 110, a component that is of the electromechanical and electromagnetic type, and also an electrically coupled a-stable multi-vibrator electronic driving circuit 108 that may be of the integrated circuit type. More precisely, the electronic driving circuit 108 may be embodied as a type LM 555 integrated circuit as is available, for example, from the integrated circuit supplier Motorola Incorporated. The driving circuit 108 is attended by externally mounted capacitive and resistive electrical components as are generally indicated in the FIG. 1 drawing, and as may be better appreciated with reference to LM 555 application literature supplied by the manufacturer.

It is also notable in the FIG. 1 drawing that the illustrated array 112, 114, 116 and 118 of altimeter instrument face-illuminating lamps 104 are connected in electrical parallel and are therefore somewhat limited as to simple input lead continuity or no continuity electrical examination for normal operating conditions. The indicated pins of the electrical connector are used to convey the three differing altimeter-energizing voltages at 122 to the respective of the FIG. 1 components and also used to convey an electrical signal output or wiper arm output of the potentiometer 102 on pin 2 of the connector. The ccw indication adjacent the potentiometer 102 indicates of course the counter clockwise end of potentiometer rotation.

Figure 2:
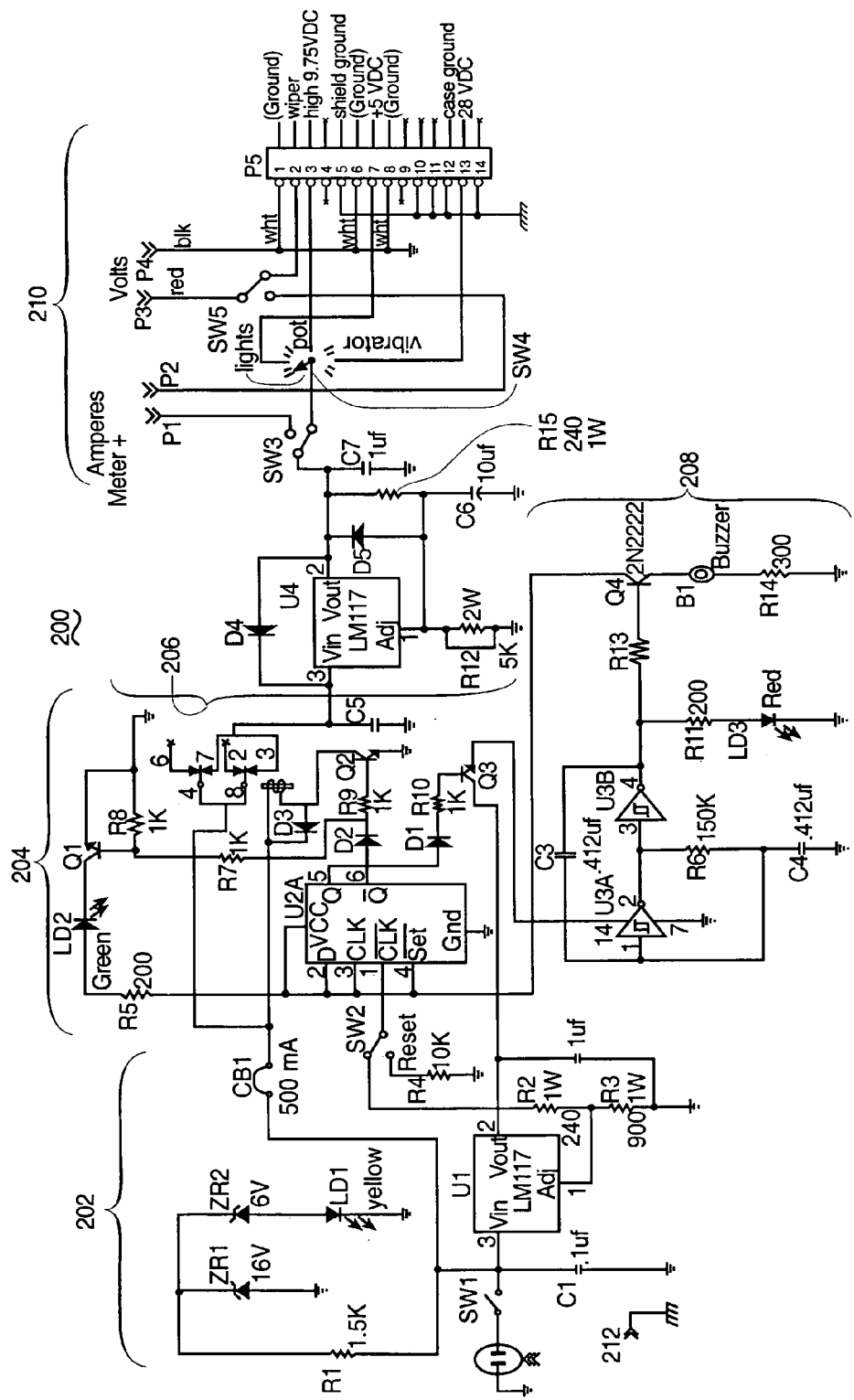
FIG. 2 shows an electrical schematic diagram of an altimeter test apparatus according to the present invention.

FIG. 2 in the drawings shows an electrical schematic diagram of an altimeter test apparatus according to the present invention, a test apparatus suitable for energizing the FIG. 1 altimeter, for example. The FIG. 2 test apparatus 200 may be considered to include the five inter-related electrical circuit areas identified with the bracket numbers 202, 204, 206, 208 and 210; each of these circuit areas is described in an ensuing paragraph herein. In considering these circuit areas, it is well to appreciate that the altimeter shown at 100 in FIG. 1 has need for the three different sources of electrical energy shown at 122 in FIG. 1, however, the altimeter does not require the simultaneous presence of these energy sources for testing purposes, as might be implied from the FIG. 1 drawing. Stated in other words, the identified illumination operation, mechanical stiction-reducing vibration generation and electrical output signal communication functions in altimeter 100 can be individually considered and need not be simultaneously operating for present test purposes.

One of the more significant circuit areas in the FIG. 2 test apparatus resides in the circuits indicated at 206 in the FIG. 2 drawing, i.e., in the variable voltage regulator circuit identified as U4 in the FIG. 2 schematic diagram. This voltage regulator may be embodied in the form of the indicated LM117 integrated circuit and if so embodied, makes use of the circuit pin numbers indicated in the FIG. 2 drawing for output and control purposes. In these pins, pin 3 serves as an input energy supply and is energized from the 28-volt direct current energy of the employed aircraft bus-compatible energy supply connected to the J1 connector in the circuit area 202 of FIG. 2. Enabling of this pin 3 energy source is achieved by way of the K1 relay in the FIG. 2 circuit area 204, as is described subsequently herein. Control of the output voltage level of the regulator U4 is achieved by way of the rheostat-connected potentiometer R12. This control allows the voltage supplied to the altimeter 100 to be set at each of the levels identified at 122 in FIG. 1 during a particular part of the present invention altimeter test. Feedback frequency rolloff and output filtering of the voltages supplied by the regulator U4 is provided by the capacitor C6 in the circuit area 206.

Another significant circuit area in the FIG. 2 drawing resides in the flip-flop U2A and relay K1 in the circuit area 204 of FIG. 2. These components are used to allow delayed precision operator control of energization of altimeter components from a present invention tester that is residing in an energized standby state. By way of operator actuation of the momentary switch SW2 in the FIG. 2 circuit area 204 the flip-flop circuit U2A is placed in a "set" condition and the relay K1 closed to energize the selected portion of the tested altimeter during a particular test. Both the set and reset or the Q and /Q outputs of the flip-flop U2A feed 2N2222A junction transistor emitter follower amplifier circuits to enable driving loads that are beyond the capability of the 74HC74 flip-flop integrated circuit itself.

Setting of the flip-flop U2A also causes energization of the operator warning signal provided by the light emitting diode LD2 in circuit area 204 and at the top of the FIG. 2 drawing. A U2A setting also causes energization of the audible signal provided by the buzzer B1 located in the lower circuit area 208 of FIG. 2. The buzzer B1 is intermittently operated for increased operator attention gathering by way of the a-stable multivibrator composed of the cross-connected inverter circuits U3A and U3B in the circuit area 208 of FIG. 2. The period of this operator attention-gathering warning is controlled by way of the electrical size selected for the capacitors C3 and C4 in circuit area 208. The 0.412 microfarad capacitors as shown at C3 and C4 in the FIG. 2 drawing provide a 153 millisecond period for the a-stable multivibrator.

A regulated source of electrical energy for energization of the electronic circuits shown in the FIG. 2 drawing is provided by the additional LM117 integrated circuit regulator shown at U1 in the lower part of the circuit area 202 of FIG. 2. This regulator is disposed to provide a fixed rather than adjustable output voltage set at 5.0 volts by way of the resistor divider composed of R2 and R3 in circuit area 202. A tester control panel "active" visual flag warning is provided to the operator by way of the light emitting diode LD1 and associated Zener diodes Zr1 and Zr2 in the circuit area 202 of FIG. 2.

Measurement of the voltage applied to an altimeter function circuit and measurement of the current flowing to this circuit is afforded by the volts and amperes terminals provided in the circuit area 210 of FIG. 2. The switch SW3 in this area provides bypassing of the current measuring instrument for measuring instrument safety and measuring instrument-absent tester operations. Digital volt ohm milliamperes (VOM) instruments or equivalents may be used for these measurements. The P5 connector shown in FIG. 2 mates with the similar connector shown in the FIG. 1 drawing to effect tether connection of the present invention tester with an altimeter under test.

Figure 3:
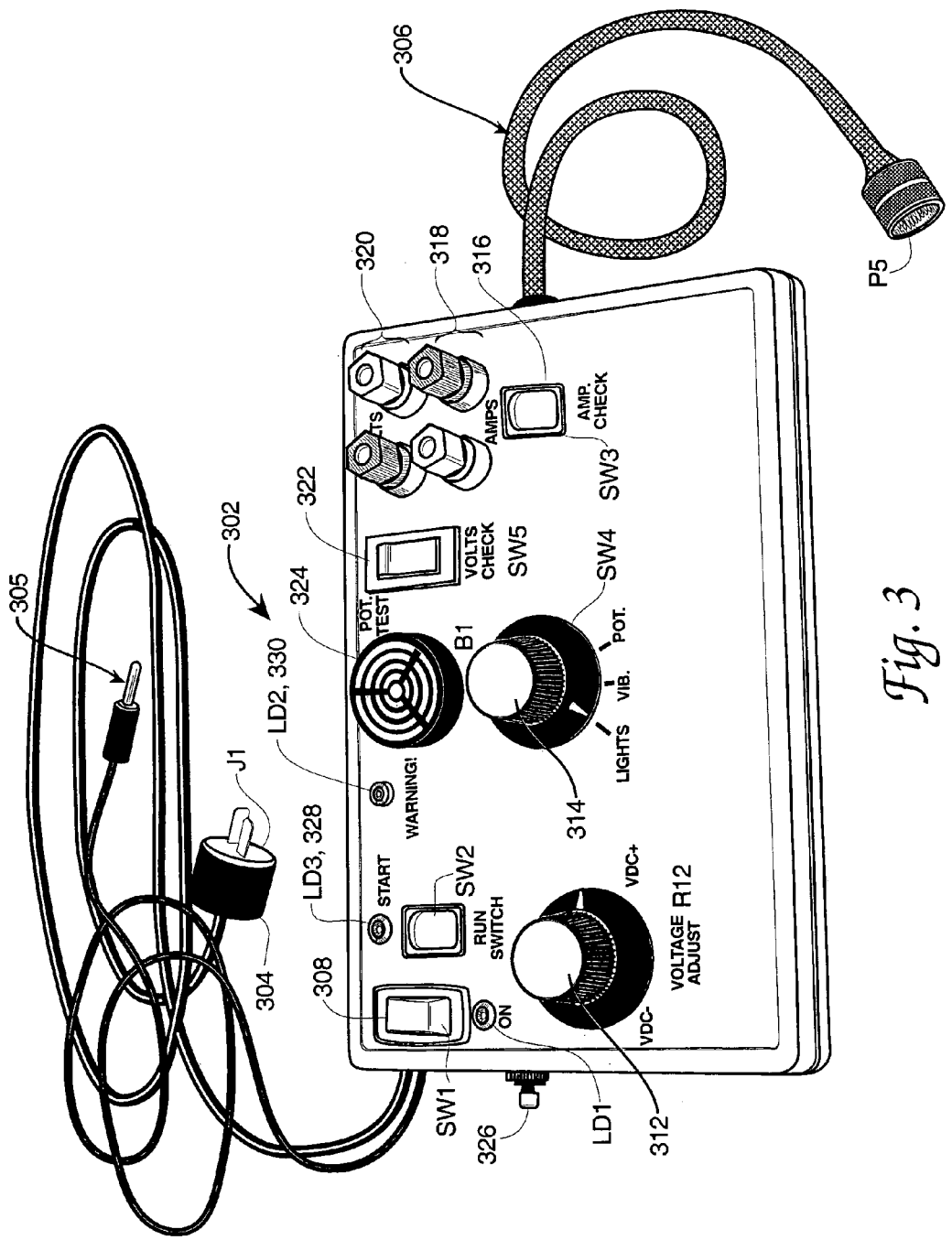
FIG. 3 shows details of the operator control panel of an altimeter test apparatus according to the present invention.

FIG. 3 in the drawings shows physical details of the housing, operator control panel and tether cables for a FIG. 2 altimeter test apparatus 200 according to the present invention. The FIG. 3 drawing also provides an identification of the controls for the test apparatus 200, 300 in terms of the control identities used in the FIG. 2 schematic diagram description of the tester. In the FIG. 3 drawing, for example, the FIG. 2 tethering input power cord and connector J1 appear at 304, the safety ground lead and connector at 305 and the multi conductor cable and connector P5 joining the tester to an altimeter at 306. The tester housing connected safety ground at 305 in FIG. 3 appears at 212 in the FIG. 2 schematic diagram.

The tester control panel front surface also appears at 302 in the FIG. 3 drawing. The additional set of control identity numbers as defined in the FIG. 2 drawing are shown in various proximity locations with the controls in FIG. 3 and are believed helpful in relating the FIG. 2 depicted tester to the FIG. 3 control panel and to the ensuing operational description of an altimeter test using the FIG. 2 and FIG. 3 tester. For completeness of the present description, it may be noted that the altimeter tested in the following operational description paragraphs is of the National Stock Number 6610013195039 type that is also identified with the catalog number of 86046A. Such auxiliary standby altimeters are manufactured by Aerosonic Corporation of Clearwater, Fla., www.aerosonic.com. This and related instruments are employed in several aircraft currently in operational usage by the U.S. Air Force.

A warning and altimeter power prevention circuit has been incorporated into the FIG. 2 and FIG. 3 tester in order to prevent one of the 9.75 volt, 5 volt and 28 volt testing voltages from being supplied to the altimeter pins 3, 7, and 13 respectively until the operator activates the "Safety Run Switch" 310 in FIG. 3. Upon actuation of switch 310, testing power is applied to the P5 altimeter conductor that has been elected by the selector switch 314. This warning and altimeter voltage prevention circuit does not preclude an incorrect application of altimeter test voltage, but is intended as a warning arrangement to remind the test operator to establish a correct test voltage using the control at 312. Another feature of the FIG. 2 and FIG. 3 tester involves the FIG. 3 manually operated circuit breaker 326, a 500 milliamperes-rated device, connected in series with the tester input energy source.

Energization of an altimeter under test commences with connection of the tester connector 304 to a source of 28-volt direct current electrical energy and connection of the safety ground conductor and connector at 305. The 28-volt source may be any of an aircraft electrical system, a battery or an electrical inverter of the static or rotary type. After connecting a 0 to 1 ampere scaled direct current ammeter and a 0 to 30 volt scaled direct current voltmeter to the terminals 318 and 320 respectively, the selector switch 322 is set to the "voltage test" position and selector switch 314 set to the position needed for operation of the altimeter component selected, i.e., to one of the lights test, vibrator test or potentiometer test positions. With these selections made, the power switch 308 can be closed.

With switch 308 closed, the audible warning device 324 is activated and the visual warning lamp at 330 is energized to call attention to the need for a correct voltage setting at 312 for the function being tested. Closure of the run switch at 310 deactivates these warning devices and energizes the selected altimeter function. Verification of normal operation by the selected altimeter function is made by vision and/or by manual sensing. The test start signal lamp at 328 illuminates to indicate testing initiation.

Operator depression of the switch 316 allows checking of the current flow magnitude to the tested altimeter function. In the case of the identified altimeter the current flow during functional test of the lights test, vibrator test and potentiometer test should be near to the magnitudes of 300, 98 and 10–162 milliamperes respectively.

The present invention therefore adds a notable degree of convenience, cost savings and safety to the functional testing of altimeters that have been heretofore tested with the use of individual instruments and other discrete testing components. The described testing apparatus and testing method are usable in a plurality of real-world testing conditions.

While the apparatus and method herein described constitute a preferred embodiment of the invention, it is to be understood that the invention is not limited to this precise form of apparatus or method and that changes may be made therein without departing from the scope of the invention, which is defined in the appended claims.

I claim:

1. Atmospheric pressure responsive aircraft auxiliary altimeter functions electrical test apparatus comprising the combination of:

a test apparatus enclosure having operator test controls, audible and visual test to operator communication transducers and external instrument metering connections received therein;

an array of electrical and electronic test control circuits received in said enclosure;

power input and tested altimeter communicating tethers connected with said array of electrical and electronic test control circuits;

said array of electrical and electronic test control circuits including:

a testing mode control bistable multivibrator electronic circuit responsive to an operator test control input signal and controlling a tested altimeter power application electrical relay;

an a-stable multivibrator circuit responsive to a present state of said testing mode control bistable multivibrator electronic circuit and connected to pulsate an output signal emitted by said audible test to operator communication transducers;

electronic current amplifier circuits connected to increase a signal magnitude characteristic of said testing mode control bistable multivibrator electronic circuit and energize an electrical coil portion of said tested altimeter power application electrical relay and selected of said visual test to operator communication transducers;

a fixed voltage output first electronic voltage regulating circuit connected intermediate a direct current aircraft power bus compatible energy source and power input terminals of said bistable multivibrator, said a-stable multivibrator circuit and said electronic current amplifier circuits in electrical energization thereof; and an output adjustable second electronic voltage regulating circuit connected intermediate said direct current aircraft power bus energy source and a tested altimeter power conveying of said tested altimeter communicating tethers in energization of a presently selected tested altimeter function.

2. The atmospheric pressure responsive aircraft auxiliary altimeter functions electrical test apparatus of claim 1 wherein said external instrument metering connections include altimeter function voltage and current measuring terminals received on said test apparatus enclosure.

3. The atmospheric pressure responsive aircraft auxiliary altimeter functions electrical test apparatus of claim 1 wherein said electronic current amplifier circuits are comprised of junction transistor emitter follower circuits.

4. The atmospheric pressure responsive aircraft auxiliary altimeter functions electrical test apparatus of claim 1 wherein said direct current aircraft power bus compatible energy source is a source of 24 volt to 28 volt direct current electrical energy.

5. The atmospheric pressure responsive aircraft auxiliary altimeter functions electrical test apparatus of claim 1 wherein said altimeter includes an instrument face illumination, a mechanical stiction-limiting vibration generator and electrical output signal communication altimeter functions, and wherein said output adjustable second electronic voltage regulating circuit is adjustable to a differing output electrical potential for each of said functions.

6. The atmospheric pressure responsive aircraft auxiliary altimeter functions electrical test apparatus of claim 5 wherein said mechanical stiction-limiting vibration generator includes an electronic multivibrator circuit in combination with an electromagnetic transducer element and said combination has an input energy requirement of 26.5+/−2.0 volts and 98 milliamperes supplied from said electrical test apparatus and wherein said electrical output signal communication altimeter functions include an output electrical potentiometer having an input energy requirement of 9.75 volts and 10–162 milliamperes supplied from said electrical test apparatus.

7. Testing apparatus for evaluating instrument face illumination, a mechanical stiction-limiting vibration generator and electrical output signal communication functions in an atmospheric pressure responsive aircraft standby auxiliary altimeter instrument, said testing apparatus comprising the combination of:

an enclosure having operator testing controls, audible and visual tester to operator communication transducers and electrical measuring connections received thereon;

an adjustable electronic voltage regulating circuit received in said enclosure and communicating electrical energy from an aircraft compatible direct current power bus to an altimeter under test input port conductor in energization of altimeter components related to a selected one of said instrument face illumination, mechanical stiction-limiting vibration generator and electrical output signal communicating altimeter functions;

an electronic latching circuit received in said enclosure and maintaining said adjustable electronic voltage regulating circuit in a selected one of a disconnected OFF state and an electrical energy communicating active state in response to a selected input signal from said operator testing controls; and electrical switching elements received in said enclosure and responsive to operator commands to select each of said instrument face illumination, mechanical stiction-limiting vibration generator and electrical output signal communicating altimeter functions in a controllable serial sequence for tested operation by said testing apparatus.

8. The testing apparatus of claim 7 wherein said aircraft compatible direct current power bus includes one of an aircraft energy supply system and a ground-based electrical inverter circuit of one of a static transformer and rectifier type, a battery type and a motor-generator type.

9. The testing apparatus of claim 7 wherein said audible and visual tester to operator communication transducers include an electrically energized sound generator and lamp sources of illumination.

10. The testing apparatus of claim 7 wherein said operator testing controls include a plurality of electrical switch elements.

11. The method of testing illumination operation, mechanical stiction-reducing vibration generation and electrical output signal communication functions in an atmospheric pressure responsive aircraft standby auxiliary altimeter instrument, said method comprising the steps of:

collecting an assembly of electrical, electronic and electromechanical components enabling of said testing into a portable enclosure having a plurality of test controls, audible and visual operator communicating transducers and electrical measurement connections received on an external portion thereof;

connecting said assembly of electrical, electronic and electromechanical components with a source of aircraft compatible direct current electrical energy and with an aircraft standby auxiliary altimeter instrument under test by way of tethering electrical conductors;

configuring said portable enclosure assembly of electrical, electronic and electromechanical components into a circuit network suited to energizing a selected first one of said illumination operation, mechanical stiction-reducing vibration generation and electrical output signal communication functions in said aircraft standby auxiliary altimeter instrument; using selected of said plurality of test controls;

heeding a plurality of indications, warnings and suggestions communicated by said audible and visual operator communicating transducers during said configuring step;

holding said selected first one of said illumination operation, mechanical stiction-reducing vibration generation and electrical output signal communication functions of said altimeter instrument in a standby state of non-energization until completion of said configuring and heeding steps;

verifying normal operation of said selected illumination operation, mechanical stiction-reducing vibration generation and electrical output signal communication functions in said aircraft altimeter instrument in response to a manually initiated termination of said holding step;

repeating said configuring, observing, holding and verifying steps for a second selected one of said illumination operation, mechanical stiction-reducing vibration generation and electrical output signal communication functions in said pressure responsive altimeter instrument; and re-accomplishing said configuring, observing, holding and verifying steps for a remaining third selected one of said illumination operation, mechanical stiction-reducing vibration generation and electrical output signal communication functions in said pressure responsive altimeter instrument.

12. The method of testing of claim 11 wherein said step of configuring said portable enclosure assembly of electrical, electronic and electromechanical components into a circuit network includes closing and opening a selected array of electrical switches included in said assembly of electrical, electronic and electromechanical components.

13. The method of testing of claim 11 wherein said step of configuring said portable enclosure assembly of electrical, electronic and electromechanical components into a circuit network includes selecting an appropriate operating voltage level output from a regulator circuit included in said assembly of electrical, electronic and electromechanical components for energizing one of said illumination operation, mechanical stiction-reducing vibration generation and electrical output signal communication functions in said altimeter.

14. The method of testing of claim 13 wherein said step of repeating said configuring, observing, holding and verifying steps includes closing and opening a second selected array of electrical switches included in said assembly of electrical, electronic and electromechanical components and selecting a second operating voltage level output from said regulator circuit included in said assembly of electrical, electronic and electromechanical components.

15. The method of testing of claim 13 wherein said step of repeating said configuring, observing, holding and verifying steps includes closing and opening a third selected array of electrical switches included in said assembly of electrical, electronic and electromechanical components and selecting a third operating voltage level output from said regulator circuit included in said assembly of electrical, electronic and electromechanical components.

16. The method of testing of claim 11 wherein said step of verifying normal operation of said selected illumination operation in said aircraft altimeter instrument includes comparing an electrical current flowing from said assembly of electrical, electronic and electromechanical components into a shunt-connected plurality N of altimeter instrument face illuminating electric lamps with an expected magnitude of electrical current flow for N operational of said lamps.

17. The method of testing of claim 11 wherein said step of verifying normal operation of said selected illumination operation in said aircraft altimeter instrument includes comparing an electrical current flowing from said assembly of electrical, electronic and electromechanical components into a multivibrator circuit energized mechanical stiction-reducing vibration generator with an expected normal magnitude of electrical current flow for said multivibrator circuit energized mechanical stiction-reducing vibration generator.

18. The method of testing of claim 11 wherein said aircraft standby auxiliary altimeter instrument is disposed in one of an aircraft instrument panel and on a maintenance test bench during said testing.

19. The method of testing of claim 11 wherein said method further includes the steps of:

keeping said assembly of electrical, electronic and electromechanical components enabling of said testing in a first partially energized safe operating mode during said heeding and holding steps using a bistable electronic latch circuit until a manual adjusting of testing parameters has been performed; and communicating visible and audible indications of need for testing parameter adjustment to an operator during said safe operating mode interval and measuring electrical current flow into said altimeter function circuits during each of said verifying, repeating and re-accomplishing steps.

20. The method of testing of claim 19 wherein said verifying step includes a manual, operator-performed, assessing of altimeter function operation and said method further includes the steps of:

performing said testing steps while said altimeter instrument is mounted within an aircraft; and energizing said assembly of electrical, electronic and electromechanical components enabling of said testing from an energy supply bus of said aircraft.

* * * * *